United States Patent [19]

Ishikawa

[11] Patent Number: 4,636,650

[45] Date of Patent: Jan. 13, 1987

[54] OPTICAL IMAGE READER FOR READING AN IMAGE ON A GIVEN MANUSCRIPT

[75] Inventor: Yujiro Ishikawa, Toyoda, Japan

[73] Assignee: Brother Industries, Ltd., Nagoya, Japan

[21] Appl. No.: 645,042

[22] Filed: Aug. 28, 1984

[30] Foreign Application Priority Data

Aug. 31, 1983 [JP] Japan ............................ 58-160111

[51] Int. Cl.[4] .......................................... H04N 1/032
[52] U.S. Cl. .................................. 250/578; 358/213; 358/294
[58] Field of Search ................ 250/578; 358/212, 213, 358/285, 293, 294

[56] References Cited

U.S. PATENT DOCUMENTS 4,225,883 9/1980 Van Atta et al. .................... 358/213
4,554,460 11/1985 Klein .................................. 250/578

Primary Examiner—Edward P. Westin
Attorney, Agent, or Firm—Kane,Dalsimer,Kane,Sullivan and Kurucz

[57] ABSTRACT

An optical image reader is disclosed which effects the reading of an image on a given manuscript by projecting beams pf light on the manuscript, receiving the reflected beams of light from the read points in a plurality of optical fibers and discerning the image in accordance with the amount of light received in the optical fibers. This optical image reader is so constructed as to detect variations in the output voltage levels of an amplifier serving to amplify detection signals derived from the read points and, based on the variations so detected, cause the output voltage levels of the amplifier to be constantly controlled at a fixed level. Thus, the adjustment required for stabilizing the reading of an image is simplified and the reading of an image is effected accurately and precisely in spite of aging.

5 Claims, 7 Drawing Figures

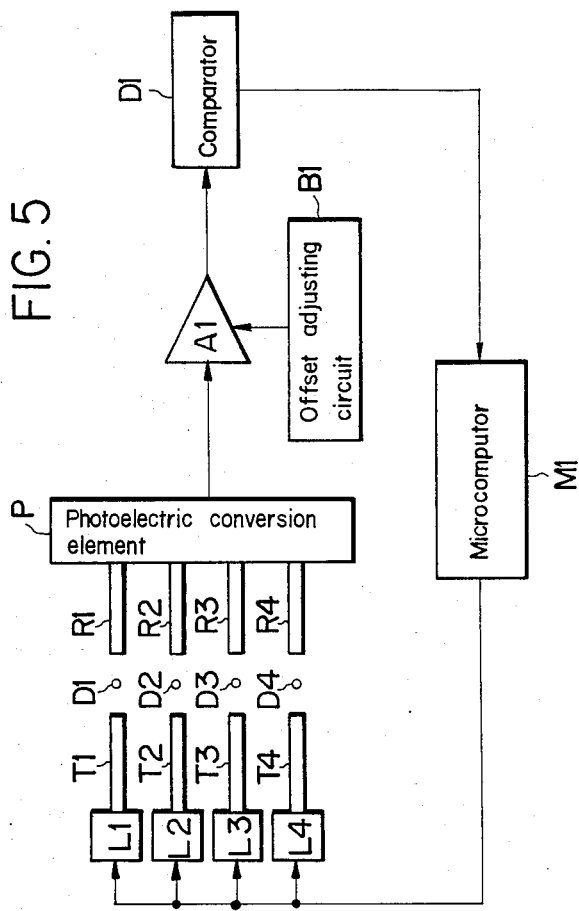

OPTICAL IMAGE READER FOR READING AN IMAGE ON A GIVEN MANUSCRIPT

BACKGROUND OF THE INVENTION (1) Field of the Invention

This invention relates to an optical image reader and more particularly to improvements in and concerning an optical image reader which effects the reading of an image recorded on a given manuscript by projecting beams of light on the manuscript, receiving the reflected beams of light in a plurality of optical fibers and discerning the image based on the amount of light received in the plurality of optical fibers.

(2) Description of the Prior Art

The conventional optical image readers of the type under discussion are, for example, constructed as follows.

As illustrated in the drawing (FIG. 5), a plurality of light emitting side optical fibers T1–T4 respectively provided on one side with light emitting elements L1–L4 project beams of light on a given manuscript bearing an image at respective read points D1–D4, a plurality of light receiving side optical fibers R1–R4 disposed correspondingly to the optical fibers T1–T4 admit the beams of light reflected from the read points D1–D4, a photoelectric conversion element P converts the beams of light received in the light receiving side optical fibers R1–R4 into electric signals, a DC amplifier A1 amplifies the electric signals and feeds out the amplified electric signals, a comparator D1 receives the detection signals SG1 issuing from the DC amplifier A1, compares the levels of the detection signals SG1 originating in the read points D1–D4 with the reference level h1 set in advance, converts the results of the comparison into binary digital signals, feeds the digital signals to a microcomputer M1 and the microcomputer M1 then reads the image informations at the respective read points D1–D4 based on the digital signals so received.

In the optical image reader constructed as described above, the output waveforms of the detection signals SG1 issuing from the DC amplifier A1 have levels corresponding to the degrees of the shade of the image information at the read points D1–D4 as shown in the drawing, (FIG. 6). These detection signals SG1 are fed out to the comparator D1 at the next stage. The comparator D1 compares these detection signals SG1 with the reference level h1 and converts the individual signals into binary digital signals based on the rule that each signal smaller than the reference level h1 is designated by "0" and each signal larger than the reference level h1 by "1". The resulting set of digital signals are fed out to the microcomputer M1, which reads the images based on these digital signals.

Incidentally, the aforementioned DC amplifier A1 by nature is prone to degradation of its operational characteristics due to the influence of aging, temperature, etc. It is, therefore, not impossible that even when an electric signal brought in from the photoelectric conversion element P has the level of OV, the DC amplifier A1 produces at its output terminal an offset voltage $\Delta V$ corresponding to the change in the aforementioned, characteristics. When the offset voltage $\Delta V$ is generated, the individual detection signals SG1 from the DC amplifier A1 have levels including the offset voltage $\Delta V$ [See FIG. 6 (b)]. If this offset voltage $\Delta V$ varies from time to time, the comparator D1 at the next stage is barred from producing digital signals accurately corresponding to the image.

It has been customary to cope with the adverse effects of this random variation of the offset voltage $\Delta V$ by providing the DC amplifier A1 with an offset adjusting circuit B1 which is adapted to adjust the offset voltage. This method which thus relies for the necessary adjustment upon the offset adjusting circuit B1 is effective, though not permanently, in curbing the influence of the offset voltage $\Delta V$ and enabling the optical image reader to read the image accurately. When the offset voltage $\Delta V$ is caused to vary gradually due to a change of temperature, change due to aging, change of brightness in the area surrounding the image reading head, etc., however, there ensues the problem that the method fails to provide adjustment accurately following the gradual variation.

SUMMARY OF THE INVENTION

This invention has originated in the effort directed to the elimination of the various drawbacks mentioned above.

One objective of this invention is to provide an optical image reader which permits an accurate and precise reading of an image by repressing the variation of the offset voltage due to a change in the operating conditions.

Another object of this invention is to provide an optical image reader which permits an accurate and precise reading of an image in spite of aging by providing automatic repression of the variation of the offset voltage.

To accomplish these objects, the optical image reader of this invention is constructed to effect the reading of an image on a manuscript by causing a reader head, which is provided with an optical reader part comprising a light source and light emission elements for receiving lights projected from the light source and reflected on the surface of the manuscript to be moved relative to the manuscript and, each time the reader part reaches as a image read point on the manuscript in consequence of the movement, setting the reader part in operation, which optical image reader is provided with an amplifier for amplifying electric signals from the light receiving elements, adjusting the means for comparing the output voltage of the amplifier with a reference voltage while the reader part is not in operation and adjusting the level of the output voltage of the amplifier based on the results of the comparison, and retaining the means for temporarily retaining the output signal from the adjusting means during the absence of the operation of the reader part and adjusting the level of the output voltage during the operation of the reader part.

The other characteristics and advantages of this invention will become apparent from the further disclosure of this invention to be made in the following detailed description of the preferred embodiment with reference to the accompanying drawings.

BRIEF DESCRIPTION OF THE DRAWINGS

FIG. 5 shows a block diagram for a prior art optical reader.

DETAILED DESCRIPTION OF THE PREFERRED EMBODIMENT

Now, one preferred embodiment of this invention will be described with reference to the accompanying drawings.

Figure 1:
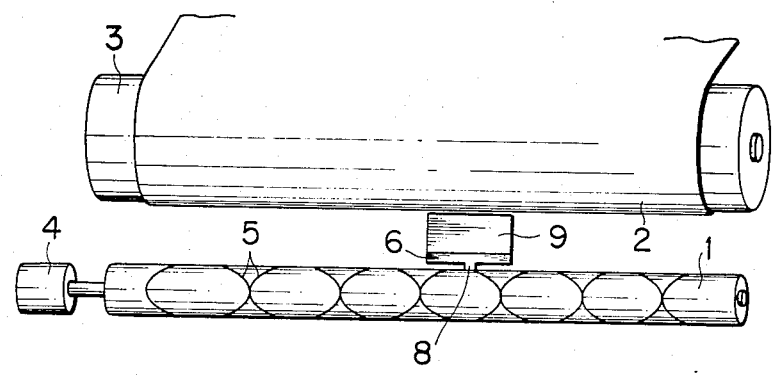
FIG. 1 is a perspective view illustrating an optical image reader of this invention in combination with the peripheral elements thereof.

In FIG. 1, a driver shaft 1 is supported at the opposite ends thereof on a frame (not shown) of the optical image reader and is disposed parallel to a support drum 3 serving to forward and control a manuscript 2. The driver shaft 1 has a spiral cam groove 5 incised on the peripheral surface and has one of the opposite ends projected out of the frame and connected to a DC motor 4.

Figure 2:
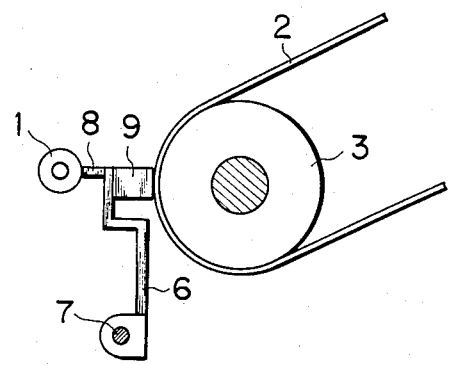
FIG. 2 is a side view illustrating the optical image reader of the present invention in combination with the peripheral elements thereof.

A holder 6 has the base part thereof movably supported, as illustrated in FIG. 2, on a guide shaft 7 disposed below the driver shaft 1 parallel thereto. An engaging piece 8 formed on the rear side of the leading end of the holder 6 is fitted in the spiral cam grooves 5. When the driver shaft 1 is rotated by the DC motor 4, therefore, the holder 6 is reciprocated along the guide shaft 7 or the axis of the support drum 3.

A reader head 9 is attached to the front side of the leading end of the holder 6 and opposed to a surface 2a of a manuscript 2 on the support drum 3. As the holder 6 is moved, the reader head 9 is able to read sequentially the image recorded on the manuscript 2 in the lateral direction.

Now, the construction of the reader head 9 will be described. Of the components of the reader head 9, those which have identical or similar counterparts in the conventional optical image reader will be denoted by like symbols for the convenience of explanation.

Figure 3:
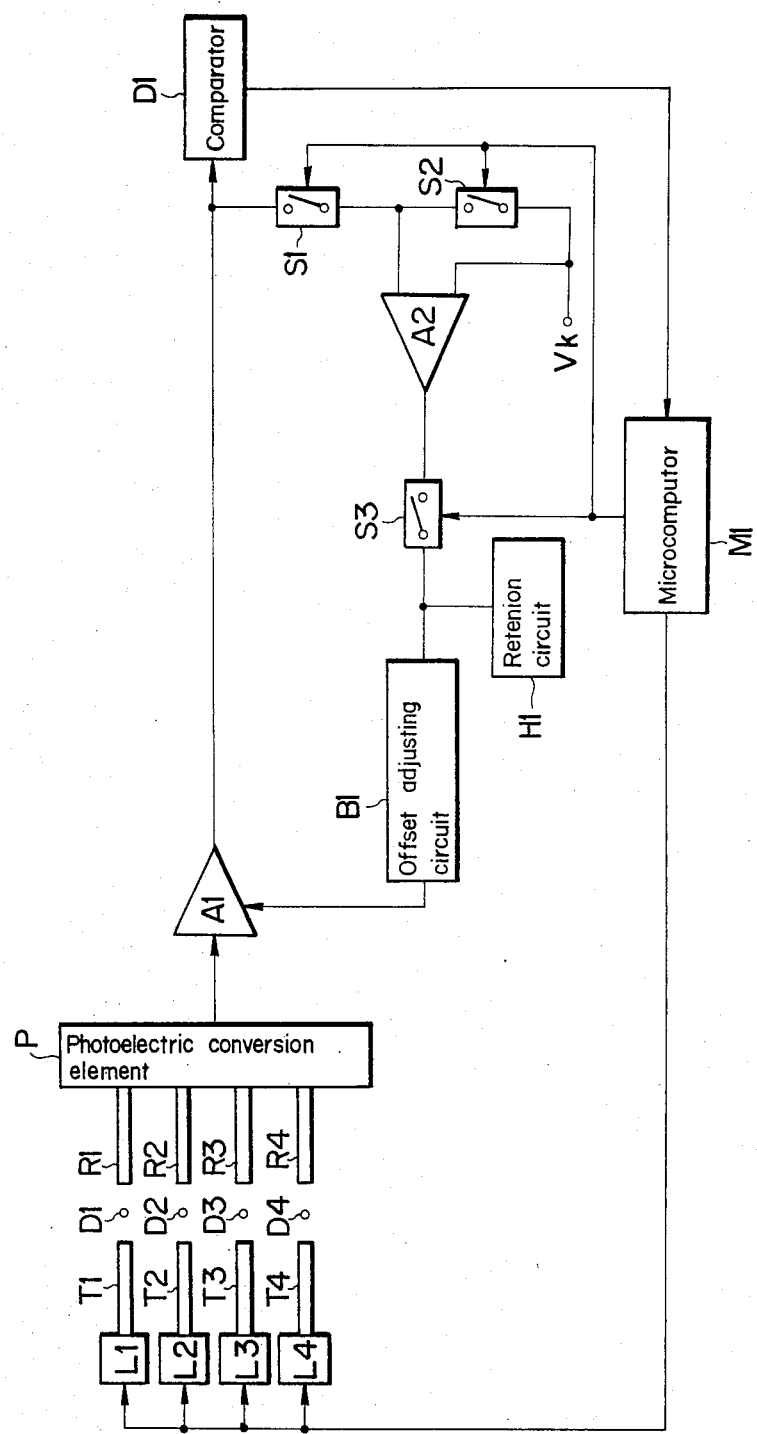
FIG. 3 is a block diagram showing the construction of an optical image reader as one preferred embodiment of the present invention.

The reader head 9 has provided therein the first through fourth light emitting side optical fibers T1-T4 provided respectively at one end with the first through four light emitting elements L1-L4 formed from luminescent diodes serving as light sources as illustrated in FIG. 3. The first through fourth light emitting side optical fibers T1-T4 are arranged sequentially in the order of their ordinal numbers, with their leading ends on the other ends pointing in a direction perpendicular to the direction of the movement of the reader head 9. The planes of light projection of the optical fibers T1-T4 are inclined by about 60 degrees relative to the surface of the manuscript 2. The lights emitting from the light emitting elements L1-L4 are projected through the optical fibers T1-T4 onto the manuscript face. The points at which the lights impinge on the manuscript face are respectively designated as the first through fourth read points D1-D4.

The first through fourth light receiving side optical fibers R1-R4 are opposed respectively to the aforementioned first through fourth light emitting side optical fibers T1-T4. The first through fourth light receiving side optical fibers R1-R4 are arranged sequentially in the order of their ordinal numbers, with the leading ends thereof arranged parallel to the leading ends of the light emitting side optical fibers T1-T4. The planes of light reception at the leading ends of the optical fibers R1-R4 are inclined by 60 degrees relative to the planes of light projection of the respective light emitting side optical fibers T1-T4. The lights impinging on the read points D1-D4 are reflected and admitted respectively into the first through fourth light receiving side optical fibers.

The other ends of the first through fourth light receiving side optical fibers R1-R4 are connected to a photoelectric conversion element P formed from phototransistors disposed within the reader head 9. This photoelectric conversion element P which is connected to a DC amplifier A1 converts the reflected lights brought in from the light receiving side optical fibers R1-R4 into electric signals proportional to the respective quantities of light received and feeds the electric signals to the DC amplifier A1.

The DC amplifier A1 amplifies the electric signals and feed the amplified electric signals as detection signals SG1 to a comparator D1 at the next stage. The comparator D1 compares the detection signals SG1 with a reference level h1 set in advance, converts the detection signals into binary digital signals based on the rule that any signal smaller than the reference level h1 is designated as "0" and any signal larger than the reference level h1 as "1", and feeds the digital signals to a microcomputer M1. To be more specific, the comparator D1 is adapted so that, where a given detection signal SG1 has a smaller level than the reference level h1, it discerns the presence of recorded images at the corresponding read point on the manuscript face and represents this status with a digital signal "0" and, where a given detection signal SG1 has a larger level than the reference level h1, it discerns the absence of recorded images at the corresponding read point on the manuscript face and represents this status with a digital signal "1".

The microcomputer M1 feeds to the first through fourth light emitting elements L1-L4 such operation control signals that sequentially switch on and off the light emitting elements in the order of their ordinal numbers by a preselected time period and cause this operation to be repeated at stated intervals and, in the meantime, accepts the digital signals from the comparator D1 and identifies the images at the respective read points. Consequently, the light emitting elements L1-L4 are sequentially actuated in the order of their ordinal numbers within a read cycle. After an idle cycle, the read cycle is repeated.

Figure 4:
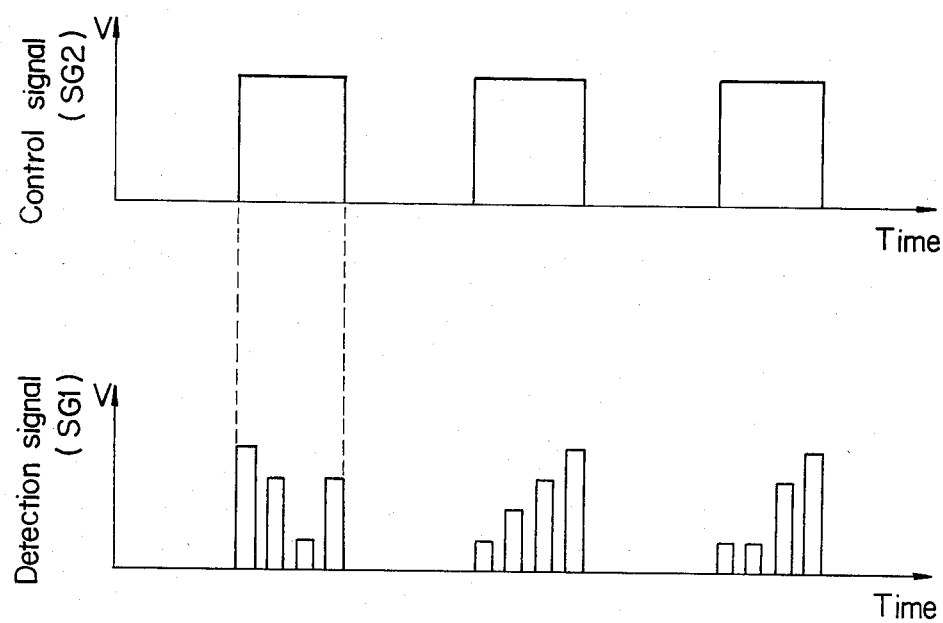
FIG. 4 is a diagram showing the waveforms of the control signal and detection signal used in the optical image reader of FIG. 3.
Figure 6A:
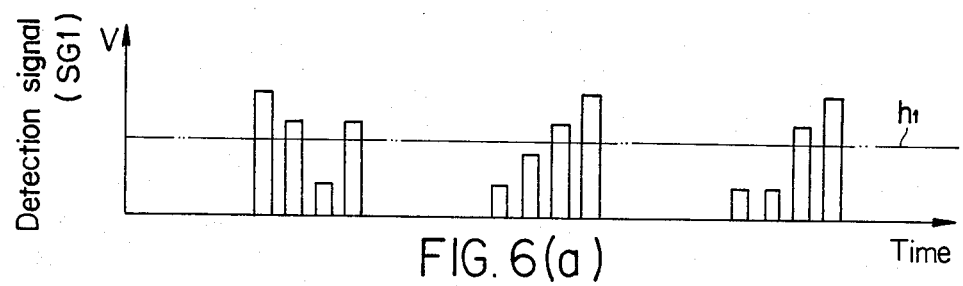
FIGS. 6(a) and 6(b) show waveforms for the prior art reader of FIG. 5.
Figure 6B:
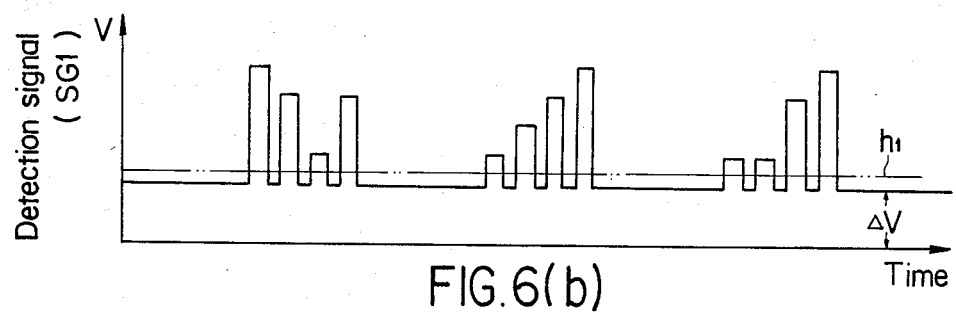

Further, the microcomputer M1 feeds control signals SG2, on an H level during the read cycle and an L level during the idle cycle as illustrated in FIG. 4, to the three switches S1, S2, and S3 which will be more fully described afterward to turn on and off the switches S1, S2 and S3.

The first switch S1 is turned on when the control signal SG2 from the microcomputer M1 is on the L level to forward the detection signals SG1 from the aforementioned DC amplifier A1 to an error amplifier A2 serving as a means for comparison. When the control signal SG2 is on the H level, the first switch S1 is turned off to interrupt the forwarding of the detection signals SG1 to the error amplifier A2. In other words, the first switch S1 is kept off during the read cycle and kept on during the idle cycle. Since the electric signal issuing from the photoelectric conversion element P is 0V during the idle cycle, therefore, the detection signal SG1 issued from the DC amplifier A1 during the idle cycle is the signal which is based on the erroneous detection of the photoelectric element P caused by the offset voltage of the DC amplifier A1 or the brightness of the area surrounding the image reader head 9 (hereinafter referred to simply as "offset voltage ΔV"). This particular detection signal SG1 is fed to the error amplifier A2.

The second switch S2 is turned off when the control signal SG2 from the microcomputer M1 is on the L level and turned on when the control signal SG2 is on the H level. The second switch S2 is so adapted that, when the first switch S1 is turned off, it will feed a reference voltage Vk to be described more fully afterward to the error amplifier A2 in the place of the detection signal SG1 from the DC amplifier A1.

The error amplifier A2 serves to compare the offset voltage ΔV received via the first switch S1 with the reference voltage Vk set in advance and feeds the difference of the two magnitudes to a retention circuit H1 through the third switch S3. Thus, it functions as a main adjusting device. This reference voltage Vk represents an allowance for the offset voltage ΔV fed out of the DC amplifier A1 when the comparator D1 effects discrimination of the detection signal SG1. The error amplifier A2 is utilized to permit constant control of the offset voltage ΔV included in the detection signal SG1 actually fed out of the DC amplifier A1 at this tolerance or the reference voltage Vk.

This reference voltage Vk and the actual offset voltage ΔV fed out of the DC amplifier A1 are compared in magnitude by the error amplifier A2. When the offset voltage ΔV is larger than the reference voltage Vk, the plus voltage representing this difference is forwarded as the magnitude of adjustment required for lowering the offset voltage ΔV to the reference voltage Vk from the error amplifier A2 via the third switch S3 to the retention circuit H1. When the offset voltage ΔV is smaller than the reference voltage Vk, the minus voltage representing the difference is forwarded as the magnitude of adjustment required for raising the offset voltage ΔV to the reference voltage Vk from the error amplifier A2 via the third switch S3 to the retention circuit H1. When the offset voltage ΔV is equal to the reference voltage Vk, the voltage of 0V is forwarded as the magnitude of adjustment required for maintaining the offset voltage ΔV intact similar to the retention circuit H1.

The third switch S3 is adapted so that it is turned on when the control signal SG2 from the microcomputer M1 is on the L level namely during the idle cycle and, conversely, turned off when the control signal SG2 is on the H level namely during the read cycle. Thus, it serves to feed the magnitude of adjustment to the retention circuit H1.

The retention circuit H1 is provided as a means for retention serves to retain temporarily the magnitude of adjustment. It feeds the magnitude of adjustment to the DC amplifier A1 through an offset adjusting circuit B1. The offset adjusting circuit B1 is intended to forward the magnitude of adjustment retained in the retention circuit H1 to the DC amplifier A1. Based on this magnitude of adjustment, the DC amplifier A1 makes the adjustment required to equalize the offset voltage ΔV to the reference voltage Vk.

Now, the operation of the image reader of this invention constructed as described above will be explained.

When the microcomputer M1 outputs the drive control signals to the light emitting elements L1-L4 and consequently causes the control signals SG2 to be fed to the switches S1, S2 and S3, as illustrating FIG. 4, the DC amplifier A1 during the read cycle feeds the detection signals SG1 based on the elements of the image information of the read points D1-D4 sequentially in the order of the ordinal numbers of the read points. Then, the comparator D1 compares the detection signals SG1 corresponding to the read points D1-D4 with the reference level h1, discerns the presence or absence of image information at the read points D1-D4, represents the discerned statuses in digital signals and feeds these digital signals to the microcomputer M1.

During the read cycle, the microcomputer M1 issues the control signals SG2 on the H level to the switches S1, S2 and S3. Consequently, the first and third switches S1, S3 are turned off and the detection signal SG1 issued from the DC amplifier A1 is not forwarded to the error amplifier A2. As a result, the reference voltage Vk reaches the input terminals of the error amplifier A2 and the output voltage issued from the error amplifier A2 becomes 0V and is not forwarded to the retention circuit H1.

Upon the start of the idle cycle which extends between the time the fourth light emitting element L4 is flickered to issue the detection signal SG1 representing the image information at the read point D4 and the time the first light emitting element L1 is flickered to start the read cycle with respect to the next read point D1, the microcomputer M1 causes the control signals SG2 being fed to the switches S1, S2 and S3 to be switched to the L level. Based on the control signals SG2 now on the L level, the first and third switches S1, S3 are turned on and the second switch S2 is turned off.

Based on the ON status of the first switch S1, the error amplifier A2 admits the offset voltage ΔV issued from the DC amplifier A1 during the idle cycle, compares the offset voltage ΔV with the reference voltage Vk and consequently detects the difference of the offset voltage ΔV. The error amplifier A2 issues the voltage of 0V when the offset voltage ΔV equals the reference voltage Vk, the plus voltage of difference when the offset voltage ΔV is larger than the reference voltage Vk and the minus voltage of difference when the offset voltage ΔV is smaller than the reference voltage Vk, respectively as the magnitude of adjustment through the medium of the third switch S3 to the retention circuit H1. The retention circuit H1 retains the magnitude of adjustment and, at the same time, feeds the retained magnitude of adjustment through the medium of the offset adjusting circuit B1 to the DC amplifier A1 so as to effect adjustment required to equalize the offset voltage ΔV to the reference voltage Vk. In the consequent status, therefore, the offset voltage ΔV of the DC amplifier A1 is retained as adjusted to the reference voltage Vk.

During the course of time, the idle cycle shifts to the read cycle. As the first light emitting L1 begins to flicker so as to effect reading of the image information at the first read point D1 in the next round, the DC amplifier A1 issues the detection signals SG1 corresponding to the read points D1-D4 with the offset voltage ΔV in the adjusted state. After this read cycle is completed and the idle cycle is started again, the error amplifier A2 admits the offset voltage ΔV from the DC amplifier A1, detects any variation in the offset voltage ΔV and, upon detection of any variation, issues the magnitude of adjustment accordingly.

Then, the offset voltage ΔV of the DC amplifier A1 is adjusted to the reference voltage Vk in accordance with the magnitude of adjustment representing the variation in preparation for the next round of the read cycle. Thus, all the offset voltages ΔV of the DC amplifier A1 serving to issue the output signals corresponding to the read points D1–D4 for each round of the idle cycle are always controlled so as to equal the preset reference voltage Vk. As a result, the offset voltages which are included in the detection signals SG1 fed to the comparator D1 at the next stage are fixed.

In the present embodiment of the invention, the offset voltages of the DC amplifier A1 are always adjusted to equal the fixed voltage (Vk) even when these offset voltages are varied by a change in the working characteristics of the DC amplifier A1 due to aging, change of temperature, etc., or by the erroneous operation of the photoelectric conversion element P owing to a change of shake in the area surrounding the reader head 9. This means that the comparator D1 effects the required discrimination by comparing the detection signals SG1 including offset voltage of a fixed magnitude (Vk) with the reference level h1, enabling the optical image reader to effect an accurate and precise reading of the image. Thus, the optical image reader obviates the necessity of making the work of the adjustment of the variation of the offset voltages and enables the reading of the image to be carried out accurately and precisely in spite of aging.

This invention is not limited to the embodiment described above.

This invention permits use of an A/D converter in place of the comparator D1 which converts the detection signals SG1 into binary digital signals, so that the detection signals will be converted into multiple bit digital signals.

What is claimed is:

1. An optical image reader for reading an image on a manuscript comprising:

a reader head including a light source for directing light to said manuscript during a read cycle, said source being deactivated during an idle cycle and a photoelectric conversion element for generating a signal corresponding to the light reflected by said manuscript, said reader head being movable with respect to said manuscript;

DC amplifying means for amplifying said signal;

error amplifying means for comparing said output voltage with a preselected reference voltage during the idle cycle and for generating differential signals;

retaining means for temporarily retaining said differential signals; and offset adjusting means for adjusting an offset of said DC amplifying means during the read cycle in accordance with said differential signals retained by said retaining means.

2. The optical image reader of claim 1 further including first switching means inserted between said error amplifying means and said retaining means which is turned on during said idle cycles.

3. An optical image reader for reading images on a manuscript comprising:

a reader head including a light source for directing light to said manuscript during a read cycle, said source being deactivated during an idle cycle, and a photovoltaic conversion element for generating a signal corresponding to light reflected by said manuscript, said reader head being movable with respect to said manuscript;

D.C. amplifying means for amplifying said signal;

comparing means for comparing an output of said D.C. amplifying means with a first reference voltage and for generating a digital signal corresponding to image information at a read point;

error amplifying means for comparing said output signal with a second reference voltage during the idle cycle and for generating differential signals corresponding to the difference between said output and said second reference signals;

retaining means for temporarily retaining said differential signals; and offset adjusting means for adjusting an offset of said D.C. amplifyig means during said read cycle with said differential error signals retained by said retaining means.

4. The optical image reader of claim 3 wherein said comparing means generates a binary digital signal.

5. The optical image reader of claim 3 wherein said comparinig means generates a binary digital signal of more than one bit.

* * * * *